(12) United States Patent
Elend et al.

(10) Patent No.: US 11,671,280 B2
(45) Date of Patent: Jun. 6, 2023

(54) NETWORK NODE WITH DIAGNOSTIC SIGNALLING MODE

(71) Applicant: NXP B.V., Eindhoven (NL)

(72) Inventors: Bernd Uwe Gerhard Elend, Hamburg (DE); Matthias Berthold Muth, Stelle (DE); Steffen Mueller, Hamburg (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/248,769

(22) Filed: Feb. 5, 2021

(65) Prior Publication Data
US 2021/0266194 A1 Aug. 26, 2021

(30) Foreign Application Priority Data
Feb. 20, 2020 (EP) .................................... 20158554

(51) Int. Cl.
*H04L 12/40* (2006.01)

(52) U.S. Cl.
CPC .. *H04L 12/40136* (2013.01); *H04L 12/40006* (2013.01); *H04L 12/40071* (2013.01); *H04L 12/40078* (2013.01); *H04L 12/40143* (2013.01); *H04L 2012/40215* (2013.01)

(58) Field of Classification Search
CPC ......... H04L 12/40136; H04L 12/40006; H04L 12/40071; H04L 12/40078; H04L 12/40143; H04L 2012/40215; H04L 2012/40208; H04L 2012/40273; H04L 12/40; H04L 67/12; H04L 1/0041; H04L 1/0045; H04L 1/0061; H04L 1/0063; H04L 1/0083; H04L 43/0847; H04L 47/806; H04L 49/102; H04L 7/00; G06F 13/4282; G06F 2213/0016
See application file for complete search history.

(56) References Cited

U.S. PATENT DOCUMENTS 9,170,128 B2 * 10/2015 Foletto ..................... G01P 3/488
10,353,837 B2 * 7/2019 Sengoku ............... G06F 13/364
10,678,726 B2 * 6/2020 Rennig ............... G06F 11/0757
(Continued)

FOREIGN PATENT DOCUMENTS

CN 105071912 A * 11/2015 ............... H04B 1/04
EP 3 550 769 A1 10/2019

*Primary Examiner* — Mounir Moutaouakil

(57) ABSTRACT

A network node for coupling to a communication bus, the node comprising:
a receiver configured to receive messages from the communication bus; and a transmitter configured to transmit first messages having a first message format and configured to transmit diagnosis messages having a second message format on the communication bus for use in determination of communication errors, wherein said transmitter is configured to send said one or more diagnosis messages having one or more of:
(i) a predetermined pattern of symbols;
(ii) a predetermined sending schedule;
(iii) a predetermined line encoding method;
(iv) a predetermined bit rate;
(v) a predetermined position in one or more of the first messages;
(vi) a predetermined signalling frequency that is out of a frequency band used for transmission of the first messages; and
(vii) a predetermined signal strength different from the signal strength used to send the first messages.

7 Claims, 1 Drawing Sheet

(56) References Cited

U.S. PATENT DOCUMENTS

| | | | |
|---|---|---|---|
| 2007/0093979 A1* | 4/2007 | Jabori | H04L 25/028 |
| | | | 326/86 |
| 2007/0234136 A1* | 10/2007 | Leet | H04L 1/0061 |
| | | | 714/704 |
| 2008/0115137 A1* | 5/2008 | Gower | G06F 13/4239 |
| | | | 718/102 |
| 2008/0273539 A1* | 11/2008 | Basso | H04L 45/742 |
| | | | 370/395.32 |
| 2015/0193297 A1* | 7/2015 | Ngo | G06F 11/0745 |
| | | | 714/758 |
| 2015/0318014 A1* | 11/2015 | Wilson | G11B 20/10018 |
| | | | 360/46 |
| 2016/0094312 A1 | 3/2016 | Fredriksson et al. | |
| 2016/0147684 A1* | 5/2016 | Sengoku | G06F 13/4004 |
| | | | 710/105 |
| 2016/0170930 A1* | 6/2016 | Weng | G06F 1/26 |
| | | | 710/110 |
| 2016/0364353 A1* | 12/2016 | Sengoku | G06F 13/4282 |
| 2017/0075852 A1* | 3/2017 | Mishra | G06F 13/4282 |
| 2017/0269147 A1* | 9/2017 | Rezgui | G01R 15/00 |
| 2018/0288158 A1* | 10/2018 | Nolan | H04L 43/065 |
| 2019/0109671 A1* | 4/2019 | Takahashi | H04L 1/0045 |
| 2019/0294572 A1* | 9/2019 | Rennig | G06F 11/0772 |
| 2020/0073774 A1* | 3/2020 | Deb | H04L 12/40032 |
| 2020/0120117 A1* | 4/2020 | Hong | H04L 12/4013 |
| 2020/0358635 A1* | 11/2020 | Park | H04L 12/40 |
| 2020/0394853 A1* | 12/2020 | Jung | H04L 43/0864 |
| 2020/0396318 A1* | 12/2020 | Jung | H04L 69/08 |
| 2020/0409559 A1* | 12/2020 | Sharon | G06F 3/0673 |
| 2021/0107397 A1* | 4/2021 | Unterweger | H05B 47/115 |

* cited by examiner

NETWORK NODE WITH DIAGNOSTIC SIGNALLING MODE

CROSS-REFERENCE TO RELATED APPLICATIONS

This application claims the priority under 35 U.S.C. § 119 of European patent application no. 20158554.4, filed on Feb. 20, 2020, the contents of which are incorporated by reference herein.

FIELD

The present disclosure relates to a network node and to a network comprising such a network node. The disclosure also relates to a method of operating a network node.

BACKGROUND

In serial communication networks like CAN and CAN FD the performance of the network is important. Serial communication networks may be used in vehicles. Functional safety is becoming more relevant in future vehicles due to their advanced driver assistance systems and self-driving capabilities.

SUMMARY

According to a first aspect of the present disclosure there is provided a network node for coupling to a communication bus, the node comprising:
- a receiver configured to receive one or more messages from the communication bus from other nodes coupled to the communication bus; and
- a transmitter configured to transmit one or more first messages having a first message format on the communication bus for communicating with said other nodes coupled to the communication bus, the transmitter further configured to transmit one or more diagnosis messages having a second message format on the communication bus for use in determination of communication errors, wherein said transmitter is configured to send said one or more diagnosis messages having one or more of:
  (i) a predetermined pattern of symbols different to the symbols of the first messages;
  (ii) a predetermined sending schedule different to the sending schedule used for the first messages;
  (iii) a predetermined line encoding method different to the line encoding used for the first messages;
  (iv) a predetermined bit rate different to the bit rate used for the first messages;
  (v) a predetermined position in one or more of the first messages;
  (vi) a predetermined signalling frequency that is out of a frequency band used for transmission of the first messages; and
  (vii) a predetermined signal strength different from the signal strength used to send the first messages.

In one or more embodiments, the predetermined pattern of symbols comprises one or more of:
  a constant pattern that provides for a constant differential voltage to be applied to the communication bus;
  a repeating symbol unit repeated for a predetermined time, wherein the symbol unit comprises two or more symbols.

In one or more embodiments, the network node is configured to use the predetermined sending schedule to provide for the transmitting of the diagnosis messages at predetermined times relative to a system clock of the node, the system clock configured to be synchronized with system clocks of other nodes coupled to the communication bus.

In one or more embodiments, the predetermined line encoding method for the diagnosis messages comprises the use of non-return-to-zero code and the predetermined line encoding method for the first messages comprises use of a line code other than non-return-to-zero code.

In one or more embodiments, the predetermined bit rate for the diagnosis messages is less than the bit rate used for the first messages.

In one or more examples, use of a greater bit rate may be more prone to errors and therefore errors in the transmit messages may be indicative of potential errors in the first messages. In one or more examples, use of a lesser bit rate may be useful for analysing the presence of unwanted signal reflections, which may be indicative of problems with the communication bus; e.g. missing or bad termination, issues with connector, etc.

In one or more embodiments, the predetermined position in one or more of the first messages comprises a position within a data field of a frame that forms the first message.

In one or more embodiments, the predetermined bit rate comprises use of a first predetermined bit rate followed by a second predetermined bit rate, different to the first in the diagnosis message.

In one or more embodiments, the node comprises a controller area network, CAN, node configured for transmitting said one or more first messages in accordance with the CAN protocol, the CAN FD protocol or the CAN XL protocol.

In one or more embodiments, the diagnosis message has a predetermined pattern of symbols different to the symbols of the first messages and a predetermined sending schedule.

In one or more embodiments, the diagnosis message has a predetermined pattern of symbols different to the symbols of the first messages and a predetermined bit rate.

In one or more embodiments, the receiver is configured to receive said diagnosis messages and is configured to set at least one flag indicative of deterioration of communication over the communication bus based on one or more of:
  (i) receipt of one or more diagnosis messages having a pattern of symbols that deviates from said predetermined pattern of symbols above a threshold;
  (ii) receipt of one or more diagnosis messages at times that deviate from the predetermined sending schedule by more than a threshold amount;
  (iii) receipt of one or more diagnosis messages that include errors in the predetermined line encoding method used for the diagnosis messages above a threshold amount;
  (iv) receipt of one or more diagnosis messages that have a signal strength more or less than a predetermined threshold;
  (v) receipt of one or more diagnosis messages wherein there is asymmetry in bit times used to transmit each of the symbols of the predetermined pattern of symbols above a threshold asymmetry; and
  (vi) receipt of one or more diagnosis messages wherein a signal reflection content of the diagnosis messages is greater than a predetermined threshold.

In one or more examples, the flag or flags may be used to control operation of one or more of the nodes or the operation of the network.

According to a second aspect of the disclosure, we provide a network node for coupling to a communication bus, the node comprising:
- a receiver configured to receive one or more messages from the communication bus from other nodes coupled to the communication bus; and
- a transmitter configured to transmit one or more messages on the communication bus for communicating with said other nodes coupled to the communication bus,
- wherein the receiver is configured to receive one or more first messages having a first message format from the communication bus, and further configured to receive one or more diagnosis messages having a second message format, and wherein the network node is configured to set at least one flag indicative of deterioration of communication over the communication bus based on one or more of:
  - (i) receipt of one or more diagnosis messages having a pattern of symbols that deviates from said predetermined pattern of symbols above a threshold;
  - (ii) receipt of one or more diagnosis messages at times that deviate from a predetermined sending schedule by more than a threshold amount;
  - (iii) receipt of one or more diagnosis messages that include errors in the predetermined line encoding method used for the diagnosis messages above a threshold amount;
  - (iv) receipt of one or more diagnosis messages that have a signal strength less than a predetermined threshold;
  - (v) receipt of one or more diagnosis messages wherein there is asymmetry in the bit time used to transmit each of the symbols of the predetermined pattern of symbols above a threshold asymmetry; and
  - (vi) receipt of one or more diagnosis messages wherein a signal reflection content of the diagnosis messages is greater than a predetermined threshold.

According to a third aspect of the invention, we provide a method for operating a network node coupled to a communication bus, the node comprising:
- a receiver configured to receive one or more messages from the communication bus from other nodes coupled to the communication bus; and
- a transmitter configured to transmit one or more first messages having a first message format on the communication bus for communicating with said other nodes coupled to the communication bus, the transmitter further configured to transmit one or more diagnosis messages having a second message format on the communication bus for use in determination of communication errors, wherein said method comprises:
- sending, using said transmitter, one or more diagnosis messages having one or more of:
  - (i) a predetermined pattern of symbols different to the symbols of the first messages;
  - (ii) a predetermined sending schedule different to the sending schedule used for the first messages;
  - (iii) a predetermined line encoding method different to the line encoding used for the first messages;
  - (iv) a predetermined bit rate different to the bit rate used for the first messages;
  - (v) a predetermined position in one or more of the first messages;
  - (vi) a predetermined signalling frequency that is out of a frequency band used for transmission of the first messages.
  - (vii) a predetermined signal strength different from the signal strength used to send the first messages.

In one or more embodiments, the method comprises setting at least one flag indicative of deterioration of communication over the communication bus based on one or more of:
- (i) receipt of one or more diagnosis messages having a pattern of symbols that deviates from said predetermined pattern of symbols above a threshold;
- (ii) receipt of one or more diagnosis messages at times that deviate from the predetermined sending schedule by more than a threshold amount;
- (iii) receipt of one or more diagnosis messages that include errors in the predetermined line encoding method used for the diagnosis messages above a threshold amount;
- (iv) receipt of one or more diagnosis messages that have a signal strength more or less than a predetermined threshold;
- (v) receipt of one or more diagnosis messages wherein there is asymmetry in the bit times used to transmit each of the symbols of the predetermined pattern of symbols above a threshold asymmetry; and
- (vi) receipt of one or more diagnosis messages wherein a signal reflection content of the diagnosis messages is greater than a predetermined threshold.

According to a fourth aspect of the disclosure we provide a method of operating a network node coupled to a communication bus, the node comprising:
- a receiver configured to receive one or more messages from the communication bus from other nodes coupled to the communication bus; and
- a transmitter configured to transmit one or more messages on the communication bus for communicating with said other nodes coupled to the communication bus,
- wherein the receiver is configured to receive one or more first messages having a first message format from the communication bus, and further configured to receive one or more diagnosis messages having a second message format, and wherein the method comprises:
- setting at least one flag indicative of deterioration of communication over the communication bus based on one or more of:
  - (i) receipt of one or more diagnosis messages having a pattern of symbols that deviates from said predetermined pattern of symbols above a threshold;
  - (ii) receipt of one or more diagnosis messages at times that deviate from a predetermined sending schedule by more than a threshold amount;
  - (iii) receipt of one or more diagnosis messages that include errors in the predetermined line encoding method used for the diagnosis messages above a threshold amount;
  - (iv) receipt of one or more diagnosis messages that have a signal strength more or less than a predetermined threshold;
  - (v) receipt of one or more diagnosis messages wherein there is asymmetry in the bit time used to transmit each of the symbols of the predetermined pattern of symbols above a threshold asymmetry; and
  - (vi) receipt of one or more diagnosis messages wherein a signal reflection content of the diagnosis messages is greater than a predetermined threshold.

According to a fifth aspect of the disclosure, we provide a network comprising a communication bus and at least two nodes coupled to the communication bus, at least two of the at least two nodes comprising network nodes as defined in the first or second aspects.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

Figure 1:
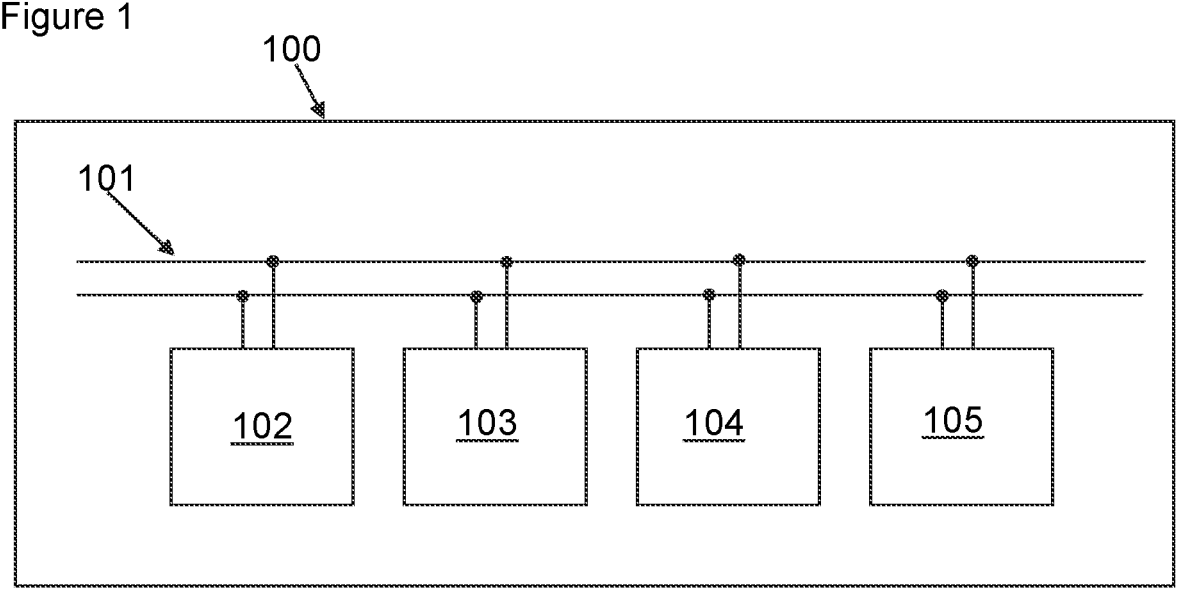
FIG. 1 shows an example embodiment of a network comprising a plurality of nodes coupled to the communication bus.

Example FIG. 1 shows at least part of a communication network 100, such as a serial communication network. An example of a serial communication network comprises a Controller Area Network (CAN) as defined by ISO 11898-1:2003, a CAN FD network as defined in ISO 11898-1:2015 or a FlexRay network as defined in ISO17458. The network comprises a communication bus 101 and a plurality of network nodes 102-105 coupled to the communication bus 101 to enable communication therebetween. Each of the nodes may comprise a transmitter for transmitting signalling representative of a message on the communication bus 101 and a receiver for receiving signalling representative of a message from the communication bus 101.

In serial communication networks error detecting and/or error correcting codes may be used within the messages exchanged between the nodes to detect and correct communication errors. For example, in CAN, a Cyclic Redundancy Check (CRC) checksum may be used so that a receiver can check for bit errors (e.g. bit flips) that may have occurred during transmission. However, this does not allow for further diagnosis of network problems.

The detection of errors in serial communication networks may be important in many circumstances. For example, functional safety is becoming more relevant in future cars or other automobiles due to their advanced driver assistance systems and self-driving capabilities. Accordingly, the CAN networks and other networks commonly used in automobiles may need to be monitored to ensure they are performing within acceptable bounds of performance. The diagnosis of communication problems may allow for early warnings prior to communication breakdown.

Figure 2:
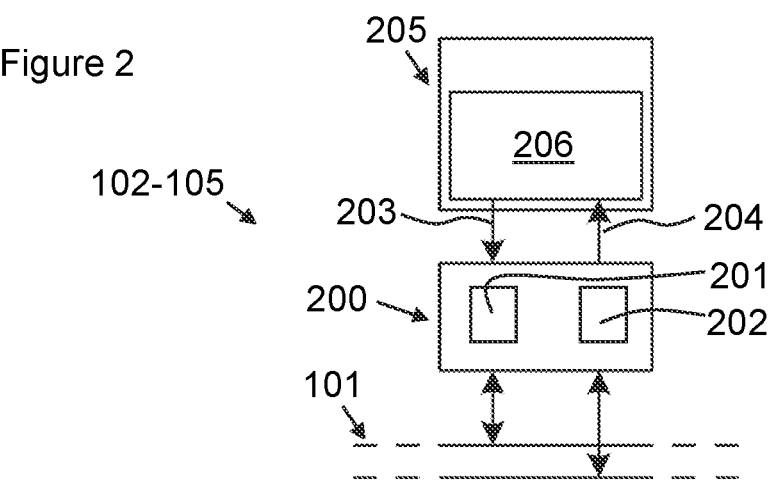
FIG. 2 shows an example embodiment of a network node.

Example FIG. 2 shows a network node 102-105 coupled with the communication bus 101. The network nodes 102-105 comprise a transmitter element 201 for transmitting messages on the bus 101 and a receiver element 202 for receiving messages from the bus 101. In this example, the transmitter element and receiver element 201, 202 comprise part of a transceiver 200. The transceiver 200 is configured to receive a digital transmit signal from a controller 205 via a first connection 203 and provide the digital transmit signal to the transmitter element 201 for converting to an analogue signal, such as an analogue differential signal for transmitting on the communication bus 101. The transceiver 200 is also configured to provide a digital receive signal to the controller 205 via a second connection 204, the digital receive signal generated by the receiver element 202 based on the analogue signalling received from the communication bus 101. The controller 205 may include a processor to process the messages encoded in the digital receive signal. The controller 205 may include a processor to generate the digital transmit signal to signal the messages it is required to send. In this example, the functionality of the node is split across the transceiver 200 and the controller 205 but in other examples there may be no separation. Thus, the transmitter of the node may be considered to comprise, at least in part, the transmitter element 201 or the transmitter element 201 in combination with the controller 205. Likewise, the receiver of the node may be considered to comprise, at least in part, the receiver element 202 or the receiver element 202 in combination with the controller 205. The controller 205 may include a protocol controller 206 that implements a particular protocol, such as CAN or a derivative thereof, on the messages and/or signalling provided over the communication bus 101.

Thus, in one or more examples, the network node 102-105, for coupling to the communication bus 101, comprises a receiver 202, 205 configured to receive one or more messages from the communication bus from other nodes 102-105 coupled to the communication bus and a transmitter 201, 205 configured to transmit messages on the communication bus 101.

The messages sent by the transmitter to communicate with other nodes 102-105 of the network 100 may include error correcting codes, but further information about the state of the communication bus or other nodes may be gained from the node 102-105 sending one or more designated diagnosis messages, wherein the content, timing and/or coding of the diagnosis messages may reveal or be more revealing about the health of the communication bus in terms of the occurrence of errors.

Accordingly, in one or more examples, the nodes 102-105 may be configured to transmit one or more first messages having a first message format on the communication bus 101 for communicating with said other nodes 102-105 coupled to the communication bus. The first messages may be considered to comprise the "normal" inter-node communication traffic on the communication bus 101. The first message format may be defined by the protocol used by the node and on the communication bus 101 of the network. The transmitter may be further configured to transmit one or more diagnosis messages having a second message format on the communication bus for use in determination of communication errors. Accordingly, the nodes or other network entities that receive the diagnosis messages may be configured to diagnose communication errors caused by problems with the communication bus or connections between the communication bus and the network nodes based on the received diagnosis messages. Thus, generally, the nodes or other network entities that receive the diagnosis messages may be configured to diagnose communication bus integrity based on the received diagnosis messages, wherein the integrity of the communication bus may be effected by problems with the wires and connectors that form the bus due to failure, wear, corrosion or unreliable connections. It will be appreciated that the analysis of the diagnosis message may identify the deterioration of the communication bus or connections thereto before the deterioration leads to communication errors, such as bit flips. It will be appreciated that in one or more examples, only one, a plurality or all of the network nodes may be configured to send said diagnosis messages. Likewise, it will be appreciated that in one or more examples, only one, a plurality of or all of the network nodes may be configured to receive said diagnosis messages in terms of being configured to interpret the diagnosis message for the purpose of identifying communication errors or potential communication errors caused by problems with the communication bus or connections to the network nodes either failing or deteriorating. The second message format may have features in common with the first message format, such as signalling rate, voltage level scheme used on the bus, message frame format, or other properties, but may also differ in one or more of such properties as will be described further below.

In this example, said transmitter is configured to send said one or more diagnosis messages having one or more of a predetermined pattern of symbols, a predetermined sending schedule, a predetermined line encoding method, a predetermined bit rate, a predetermined position in one or more of the first messages or a predetermined signalling frequency or a predetermined signalling frequency that may be out of a frequency band used for transmission of the first messages. In one or more examples the diagnosis messages and the first messages may differ in terms of combinations of two, three or more of the above properties.

Thus, in one or more examples, the predetermined pattern of symbols used for the diagnosis message may be different to the symbols of the first messages. Typically, the symbols used in the first message will include common elements in terms of the headers and other controlled fields of a frame format, but a data portion will typically differ from message to message. The diagnosis message may comprise a fixed and predetermined pattern of symbols. The transceiver 200, in any of the examples herein, may be configured to generate the diagnosis messages without instruction from the controller 205 or, alternatively, the controller 205 provides data to cause the transceiver to transmit a diagnosis message. Accordingly, the controller 205 may be configured to provide a corresponding fixed pattern of digital transmit data to the transmitter element 201. The diagnosis message may not include a header and/or may not follow the same frame format as defined by the first message format of the first messages. The use of a predetermined pattern of symbols may also provide for identification of the diagnosis messages from first messages at the receiver. In one or more examples, the predetermined pattern of symbols used for the diagnosis message may provide for a constant differential voltage to be applied to the communication bus. Accordingly, the pattern of symbols may be the same symbol repeated for a predetermined time. The predetermined time may comprise at least one, two, three or more bit times wherein the bit time comprises the time in which a single bit of the first message is transmitted. In one or more examples, the predetermined pattern of symbols used for the diagnosis message may provide for a differential voltage to be applied to the communication bus that alternates between two different voltage levels with a constant frequency. Accordingly, the pattern of symbols may comprise a repeating symbol unit repeated for a predetermined time, wherein the symbol unit comprises two or more symbols. For example, a digital signal of 1-0-1-0 or 1-1-0-0 may provide for such a repeating pattern of symbols to be transmitted. It will be appreciated that a digital transmit signal may be provided to the transmitter element 201 to cause it to generate the predetermined pattern of symbols to be applied to the communication bus. Therefore, depending on the line code applied by the transmitter, the digital signal provided thereto may have a different pattern in its logic levels to the predetermined pattern of symbols that are applied to the communication bus.

A predetermined pattern that provides a constant voltage on the communication bus may be advantageous in one or more examples. Thus, problems with the communication bus such as changing contact resistance or poor connections could cause the diagnosis message to have a changing voltage despite being transmitted with a constant voltage. Accordingly, a constant pattern of predetermined symbols of the diagnosis message may be useful for detecting communication bus defects. A pattern of symbols comprising a repeating symbol unit or constant frequency may be advantageous in one or more examples for determining signal reflections in the communication bus, which can be indicative of a problem. The regular frequency and therefore predictably changing diagnosis message may aid detection and analysis of signal reflections, such as by a correlator.

In one or more examples, the predetermined sending schedule used for the diagnosis messages may be different to the sending schedule used for the first messages. For example, the first message may be sent ad-hoc, such as when data is required to be sent between nodes. The sending schedule for the diagnosis messages may be defined relative to a system clock of the network and, accordingly, the diagnosis messages may be sent and therefore expected to be received at particular system times. The nodes may therefore include a system clock that is configured to be synchronized with system clocks of other nodes coupled to the communication bus. Methods of synchronisation will be known to those skilled in the art. In other examples, the sending schedule for the diagnosis messages may be defined relative to the first messages. Thus, the sending schedule may state that a diagnosis message should be transmitted, and therefore expected to be received, a predetermined time after (or before) a first message or after/before every first message or after/before selected first messages. Other example sending schedules may comprise after every n first messages, where n is greater than 2. The use of a predetermined sending schedule may also provide for identification of diagnosis messages from first messages at the receiver. The sending schedule may also define when each of a plurality of network nodes coupled to the communication bus are to send diagnosis message. Accordingly, a notional "first" network node may be configured to send one or more diagnosis messages followed by a notional "second" network node. The use of a schedule may assist diagnosis of problems because non-receipt or partial receipt of a diagnosis message can be comparted to what is expected to be received at an expected time, which may help diagnose bus problems.

In one or more examples, the predetermined line encoding method for the diagnosis messages may be different to the line encoding used for the first messages. Example line encoding comprises NRZ, RZ, Manchester encoding, bipolar or differential Manchester encoding. Accordingly, the first message format may define use of a first line encoding scheme, such as NRZ in CAN, and the second message format may define use of a second, different, line encoding scheme. The use of a different encoding scheme may assist with distinguishing a diagnosis message from a first message at the receiver. The use of a different encoding scheme may be useful in identifying errors, such as if the encoding scheme used for the diagnosis message is more susceptible to a particular error type than the encoding scheme for the first messages, the occurrence of an error in the diagnosis message may be indicative of a problem that may affect or is about to affect the first messages and therefore the reliability of the network 100. In one or more examples, the second line encoding scheme may be selected to enable the transmitting of a diagnosis message that provides a constant voltage level on the communication bus, which may not be achievable with the line encoding scheme defined by the first message format. For example, if the first message format defines the use of Manchester encoding, a constant communication bus voltage may not be achievable, but using NRZ as the second line encoding scheme may make it possible for the constant voltage level to be provided.

In one or more examples, a predetermined bit rate is used for transmitting the diagnosis messages that is different to the bit rate used for the first messages. In one or more examples, the bit rate may be greater. A faster bit rate may be more susceptible to errors and may therefore be indicative of a problem that may affect or is about to affect the first messages and therefore the reliability of the network 100. The use of a different bit rate may be used by a receiver to distinguish a diagnosis message from a first message at the receiver. In one or more examples, a slower bit rate may be used for the diagnosis message. A measure of the reflection content in a received message may be indicative of the health of the communication bus and the use of a slower bit rate may make such reflection analysis technically easier. In one or more examples, the diagnosis message may use a first bit rate and a second bit rate different to the first in the same diagnosis message or over a set of diagnosis messages. The use of different bit rates may assist with analysis of problems on the bus to identify the location of poor connections and the like.

In one or more examples, the diagnosis message may be sent as part of the first messages. Accordingly, the diagnosis message may have a predetermined position in one or more of the first messages. The first message format may define that the diagnosis message is inserted after the header, at the end of the message or at the start of the message. The position of the diagnosis message may aid a receiver to identify and extract the diagnosis message from the first message.

In one or more examples, the diagnosis messages are transmitted on the communication bus with a predetermined signalling frequency that is out of a frequency band used for transmission of the first messages. Accordingly, for nodes that do not need to receive the diagnosis messages, the presence of the diagnosis messages may be transparent to them as those nodes are configured to receive, such as only receive, signalling that is in-band and not out-of-band. For nodes that are configured to receive the diagnosis messages, the receiver of those nodes may be configured to receive the "in-band" first messages and the "out-of-band" diagnosis messages.

In one or more examples, the predetermined line encoding method for the first messages comprises the use of non-return-to-zero code and the predetermined line encoding method for the diagnosis messages comprises use of a line code other than non-return-to-zero code. In one or more other examples, the predetermined line encoding method for the diagnosis messages comprises the use of non-return-to-zero code and the predetermined line encoding method for the first messages comprises use of a line code other than non-return-to-zero code.

In one or more examples, the predetermined position in one or more of the first messages comprises with a data portion of the first message.

In one or more examples, the predetermined signalling frequency is greater than or less than the signalling frequency used for the first messages. In one or more examples, a greater signalling frequency may be more prone to errors and therefore errors in the transmit messages may be indicative of potential errors in the first messages. In one or more examples, the predetermined signalling frequency is less than the signalling frequency used for the first messages. In one or more examples, a lesser signalling frequency may allow for less intensive analysis the diagnosis message, such as in terms of reflection content that is indicative of potential errors.

In one or more examples, the predetermined signal strength used to transmit the diagnosis messages may be different from the signal strength used to send the first messages. In one or more examples, the predetermined signal strength for the diagnosis messages may be lower than a minimum threshold used for the first messages. It will be appreciated that signal strength may refer to the voltage used on the communication bus. The protocol used for the first messages may define a minimum voltage (or maximum voltage) that may be used for transmission of the first messages and, accordingly, the predetermined signal strength may be less than this minimum voltage. The use of a lower signal strength may reveal deterioration in the bus that leads to an unacceptable signal to noise ratio before the first messages are affected. In one or more other examples, the predetermined signal strength may be higher that that used for the first messages, such as higher than the maximum voltage.

It will be appreciated that in this example, the node comprises a controller area network, CAN, node configured for transmitting said one or more first messages in accordance with the CAN protocol, the CAN FD protocol or the CAN XL protocol. In other examples, different protocols may be implemented by the nodes, such as FlexRay Lin, eMOST, or automotive Ethernet.

The property of the diagnosis message or its second message format that distinguishes it from the first messages may be used by the receiver to filter out the diagnosis messages for further processing. Accordingly, the receiver may have means to detect the predetermined pattern of symbols by way of a correlator or other suitable device. The receiver may have the system clock such that when a message is received may be at least partly determinative of the message being a diagnosis message. The receiver may have means to sample the message received and determine its bit rate and other properties, such as timing symmetry. The receiver may have a processor to extract the diagnosis message from the first message. The receiver may include one or more filters or other suitable circuitry to separate the first messages from the diagnosis messages based on their signalling frequency. The receiver may include a correlator for analysing signal reflection content.

One or more of the network nodes 102-105 may be configured to receive the diagnosis messages and determine the health of the network 100 or communication bus 101. Thus, the receiver may be configured to receive said diagnosis messages and may be configured to set at least one flag indicative of the occurrence of a communication error or (e.g. potential) problem with the communication bus based on one or more of:

(i) receipt of one or more diagnosis messages having a pattern of symbols that deviates from said predetermined pattern of symbols more than a threshold;
(ii) receipt of one or more diagnosis messages at times that deviate from the predetermined sending schedule by more than a threshold amount;
(iii) receipt of one or more diagnosis messages that include errors in the predetermined line encoding method used for the diagnosis messages;
(iv) receipt of one or more diagnosis messages that have a signal strength more or less than a predetermined threshold, such as a threshold that is calibrated based on test diagnosis messages;
(v) receipt of one or more diagnosis messages wherein there is asymmetry in the bit times used to transmit each of the symbols of the predetermined pattern of symbols above a threshold asymmetry; and
(vi) receipt of one or more diagnosis messages wherein the signal reflection content of the diagnosis messages is greater than a predetermined threshold.

In one or more examples, the health of communication bus 101 and therefore the state of the flag may be determined based on one or more of the received strength of the diagnosis messages and the temporal deviation from an expected time of arrival of the diagnosis message in relation to the system time. Accordingly, a combination of features may be required to be present before the flag is set. Further, different flags may be indicative of different communication errors or different potential communication errors. Accordingly, the node may be configured to perform different action to mitigate the active or potential communication errors indicated by the different flags.

In one or more examples, the receiver may be configured to use a combination of two or more of the above listed factors to determine the setting of the flag.

The flag may be monitored by a supervisory module of the network that may take action to rectify errors flagged by the nodes, such as by one or more of limiting communication on the bus to particular nodes, re-routing the messages on the bus 101, changing the signalling rate, shutting down the network and/or any other preventative or restorative action.

Figure 3:
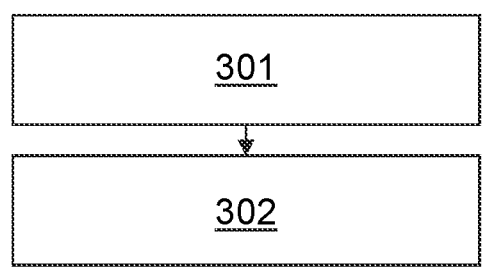
FIG. 3 shows a flow chart illustrating an example method of operating a network node.

Example FIG. 3 shows an example method for operating a network node comprising a receiver configured to receive one or more messages from the communication bus from other nodes coupled to the communication bus; and a transmitter configured to transmit one or more first messages having a first message format on the communication bus for communicating with said other nodes coupled to the communication bus, the transmitter further configured to transmit one or more diagnosis messages having a second message format on the communication bus for use in determination of communication errors, wherein said method comprises:

sending 301, using said transmitter, one or more diagnosis messages having one or more of:
(i) a predetermined pattern of symbols different to the symbols of the first messages;
(ii) a predetermined sending schedule different to the sending schedule used for the first messages;
(iii) a predetermined line encoding method different to the line encoding used for the first messages;
(iv) a predetermined bit rate different to the bit rate used for the first messages;
(v) a predetermined position in one or more of the first messages;
(vi) a predetermined signalling frequency that is out of a frequency band used for transmission of the first messages;
(vii) a predetermined signal strength different from the signal strength used to send the first messages.

The method may include the step of setting 302 at least one flag indicative of deterioration of communication over the communication bus based on one or more of:
(i) receipt of one or more diagnosis messages having a pattern of symbols that deviates from said predetermined pattern of symbols above a threshold;
(ii) receipt of one or more diagnosis messages at times that deviate from the predetermined sending schedule by more than a threshold amount;
(iii) receipt of one or more diagnosis messages that include errors in the predetermined line encoding method used for the diagnosis messages above a threshold amount;
(iv) receipt of one or more diagnosis messages that have a signal strength less than a predetermined threshold;
(v) receipt of one or more diagnosis messages wherein there is asymmetry in the bit time used to transmit each of the symbols of the predetermined pattern of symbols above a threshold asymmetry; and
(vi) receipt of one or more diagnosis messages wherein a signal reflection content of the diagnosis messages is greater than a predetermined threshold.

It will be appreciated that method step 301 and method step 302 may, in one or more examples, be performed by different nodes.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services.

These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A network node for coupling to a communication bus, the node comprising:
   a receiver configured to receive one or more messages from the communication bus from other nodes coupled to the communication bus; and
   a transmitter configured to operate, at different times, in a messaging mode and a diagnostic signaling mode;
   wherein, in the messaging mode, the transmitter is configured to transmit first messages having a first message format on the communication bus for communicating with said other nodes coupled to the communication bus;
   wherein, in the diagnostic mode, the transmitter is configured to transmit one or more diagnosis messages having a diagnostic signalling format that is distinct from the first message format on the communication bus for use in determination of communication errors, wherein said transmitter is configured to send said one or more diagnosis messages having one or both of:
      a predetermined pattern of symbols different from the symbols of the first messages; and
      a predetermined line encoding method different from a line encoding method used for the first messages;
   wherein the network node is configured to transmit the diagnosis messages at predetermined times relative to a system clock of the node according to a predetermined diagnostic schedule that is different from a predetermined schedule that species transmission times for the first messages; and
   wherein the system clock configured to be synchronized with system clocks of other nodes coupled to the communication bus.

2. A network node according to claim 1, wherein the predetermined pattern of symbols comprises:
   a constant pattern of symbols configured such that a constant differential voltage is applied between differential signalling lines of the communication bus.

3. A network node according to claim 1, wherein the network node is configured to use of a non-return-to-zero encoding method to transmit the diagnosis messages and to use a return-to-zero encoding message to transmit the first messages.

4. A network node according to claim 1, wherein the predetermined pattern is a symbol unit of two or more symbols that is repeated for a predetermined time.

5. A network node for coupling to a communication bus, the node comprising:
   a receiver configured to receive one or more messages from the communication bus from other nodes coupled to the communication bus; and
   a transmitter configured to transmit one or more messages on the communication bus for communicating with said other nodes coupled to the communication bus;
   wherein the receiver is configured to receive one or more first messages having a first message format from the communication bus;
   wherein the receiver is further configured to receive one or more diagnosis messages having a diagnostic message format that is different from the first message format; and
   wherein the network node is configured to:
   identify received messages having the diagnostic message format as the one or more diagnosis messages; and set at least one flag indicative of deterioration of communication over the communication bus in response to any of the following:
   (i) determining that the one or more diagnosis messages include a pattern of symbols that deviates from said predetermined pattern of symbols above a threshold;
   (ii) determining that at an arrival time of at least one of the one or more diagnosis messages deviates from a time corresponding to a predetermined sending schedule by more than a threshold amount;
   (iii) determining that at least one of the one or more diagnosis messages includes errors in the predetermined line encoding method used for the diagnosis messages above a threshold amount;
   (iv) determining that at least one of the one or more diagnosis messages has a signal strength less than a predetermined threshold signal strength;
   (v) determining that at least one of the one or more diagnosis messages wherein a timing asymmetry in the bit time used to transmit each of the symbols of the predetermined pattern of symbols is greater than a threshold asymmetry value; and
   (vi) determining that a signal reflection coefficient of at least one of the one or more diagnosis messages is greater than a predetermined reflection coefficient value.

6. The network node of claim 5, wherein the flag is set based on a plurality of diagnosis messages.

7. A method for operating a network node coupled to a communication bus, the node comprising:
   a receiver configured to receive one or more messages from the communication bus from other nodes coupled to the communication bus; and
   a transmitter configured to operate, at different times, in a messaging mode and a diagnostic mode;
   wherein the transmitter is configured, in the messaging mode, to transmit one or more first messages having a first message format on the communication bus for communicating with said other nodes coupled to the communication bus;
   wherein the transmitter is configured, in the diagnostic mode, to transmit one or more diagnosis messages having a diagnostic message format that is different from the first message format on the communication bus for use in determination of communication errors, wherein said method comprises:

sending, using said transmitter, one or more diagnosis messages having one or both of:
  a predetermined pattern of symbols different to the symbols of the first messages; and
  a predetermined line encoding method that is different from a line encoding used for the first messages; and
wherein said method further comprises:
setting at least one flag indicative of deterioration of communication over the communication bus based on one or more any of the following:
(i) receipt of one or more diagnosis messages having a pattern of symbols that deviates from a predetermined pattern of symbols by a number of symbols above a threshold number of symbols;
(ii) receipt of one or more diagnosis messages at times that deviate from a predetermined diagnostic schedule specifying transmission times for the diagnosis messages by more than a threshold amount, wherein the diagnostic schedule is different from a schedule specifying transmission times for the first messages;
(iii) receipt of one or more diagnosis messages that include errors in the predetermined line encoding method used for the diagnosis messages above a threshold amount;
(iv) receipt of one or more diagnosis messages that have a signal strength less than a predetermined threshold;
(v) receipt of one or more diagnosis messages wherein there is asymmetry in the bit time used to transmit each of the symbols of the predetermined pattern of symbols above a threshold asymmetry; and
(vi) receipt of one or more diagnosis messages wherein a signal reflection coefficient of those diagnosis messages is greater than a predetermined reflection coefficient value.

* * * * *